United States Patent Office 2,809,116
Patented Oct. 8, 1957

2,809,116

2,4,6-TRINITROBENZOATE ESTER-ADDITION COMPOUND INDICATOR

Donald E. Laskowski, Chicago, Ill., assignor to Armour Research Foundation of Illinois Institute of Technology, Chicago, Ill., a corporation of Illinois No Drawing. Application October 7, 1955,
Serial No. 539,280

7 Claims. (Cl. 106—19)

This invention relates to indicators, and more particularly, to compositions which may be used as indicators for specific temperatures or other conditions to be described hereinafter, which compositions effect a color change to indicate the existence of a given temperature or other activating condition.

Color change type indicators have been known for a number of years for one purpose or another. For example, in titration, a number of indicators are known which are capable of changing from one color to another with changes in the pH of the indicator solution. These indicators are particularly valuable because they are "reversible" or capable of changing back and forth from one color to the other with repeated changes in the pH. Indicators have also been suggested for use in indicating a temperature change, but in almost every case these indicators are not "reversible" but rather change only once, when a given temperature is reached, and will not change back to their original color. Another problem of particular importance in connection with indicators is the "sharpness" of the change. A gradual not easily perceived change in color taking place over a temperature range is not particularly helpful in the indicator field. Instead, the ideal indicator changes abruptly, for example, as soon as a given temperature is reached or some other given condition is reached.

The theories forming the basis for the chemical and/or physical mechanisms involved in indicators depend to such a substantial extent upon the individual indicator (if the theories with respect thereto are actually understood) that those skilled in the art have been compelled to rely upon more or less "hit and miss" attempts to develop indicators in the various fields.

The instant invention is based upon a discovery of the indicator properties of a certain specific group of compounds when used in conjunction with certain electron donors. This combination is capable of effecting extremely sharp color changes at specific temperatures; and this combination is unique in that it is reversible in its color changing properties. In addition, certain addition compound phenomena peculiar to the instant combination not only make possible sharp changes in color in response to temperature changes but also sharp changes in color in response to the presence of certain solvents, so that these indicators may also be used to detect the presence of such solvents.

It is, therefore, an important object of the instant invention to provide an improved indicator, and more particularly, to provide an improved color indicator.

It is another object of the instant invention to provide an improved color indicator that is responsive to temperature changes and is reversible in its response to such temperature changes.

Still another object of the instant invention is to provide an improved color indicator that is responsive to the presence of certain solvents.

A further object of the instant invention is to provide a color indicator composition comprising esters of 2,4,6-trinitrobenzoic acid, as acceptors, and certain solid aromatic compounds, as electron donors, which compounds provide a uniquely sensitive color indicator system.

Other objects, features and advantages of the present invention will become apparent to those skilled in the art from the following detailed disclosure thereof.

The invention consists in an indicator composition containing a 2,4,6-trinitrobenzoic acid ester and an aromatic compound that is an electron donor which forms an addition compound with said ester in the liquid phase, but possesses sufficient steric hindrance properties to cause decomposition of the addition compound during the transition from liquid to solid phase.

Although it is not desired to limit the instant invention to any particular theory, it is believed that the general principles here involved can be explained, at least on the basis of the results herein discovered. First of all, the ester here employed may be considered as having the following structural formula:

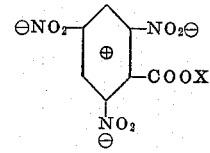

Although the benzene ring is ordinary assumed to have a high electron concentration imparting a negative charge thereto, the nitro ($NO_2$) groups are strong electron withdrawing groups which tend to develop an increased or higher electron density in their immediate vicinity. This results in the development of partial negative charges (indicated in the above formula as an encircled minus sign) at the nitro groups. The nitro groups presumably "borrow" electrons from the benzene ring in order to develop their partially negative charge and this results in a partial or relatively weak positive charge (indicated by the encircled plus sign) in the benzene ring itself. The benzene ring thus becomes an electron acceptor. The ester grouping in the molecule will also function generally as an electron withdrawing group (weaker than a carboxylic acid group, however) but the main function of esterification of the instant acid is stabilization thereof for the purposes of the instant invention.

The electron donor here employed in an aromatic compound which contains a benzene ring, plus some other group attached thereto (which may be other benzene rings and/or other radicals which will be described) and one of the simplest electron donors is phenol which may be shown as having the following structural formula:

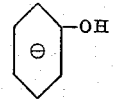

In phenol, or in any of the other electron donors here employed, the inherently partial negative charge of the benzene ring resulting from the higher electron density generally associated therewith is retained. In addition, one or more groups, such as the OH group here shown are attached to the benzene nucleus primarily to afford a "blocking" group. In the absence of such blocking group, steric hindrance would not interfere with the formation of an addition compound. In other words, the instant addition compound is a compound that is formed, not by the combination of atoms to form a molecule but rather by the combination of molecules to form a rather loosely bound new compound. In this new compound, the positively charged and negatively charged benzene rings of the acceptor and donor, respectively, may be pictured as lying closely adjacent in generally parallel arrangement. The addition compound is formed during the transition from solid to liquid. It will be appreciated that, if phenol is to be used, the instant composition containing the solid ester and solid phenol would be used for detecting relatively low temperatures because of the low melting point of the phenol. As the transition of the composition from solid to liquid takes place at a specific temperature, the molecules in the compositions are apparently afforded sufficient freedom or mobility from the normal forces holding the molecules of a given compound in position (as in a crystalline compound) so that the addition compound of the two molecules may be formed. This results instantly in a color change apparent to the observer. As the composition is permitted to cool back down from the temperature at which the color change took place, solidification commences and, if a truly stable addition compound has been formed, no color change will appear. On the other hand, in the case of the instant electron donors, certain blocking groups (such as the OH group here indicated) are believed to be primarily responsible for steric hindrance which resists the formation of the addition compound. Such steric hindrance is overcome in the liquid phase so that the addition compound is formed, but it prevails in the solid phase so that the addition compound decomposes again and the color change is reversed. Although the instant description of the theory upon which the instant invention is believed to be based does not explain all of the peculiarities which have been observed in studying the instant invention, it is believed to explain certain fundamental principles.

In the practice of the instant invention one of the compounds which may be used is an ester of 2,4,6-trinitrobenzoic acid having the following formula:

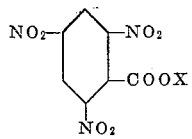

wherein X is an alcohol residue (of the alcohol XOH). So far as is known, any alcohol residue may be used, with the obvious exception of those containing radicals which will carry out chemical reaction with other groups in the ester molecule or in the electron donor. In general, X may be a radical containing from 1 to 20 carbon atoms, but preferably from about 1 to about 12 carbon atoms, and X may be an alkyl, alkenyl, alkaryl, aralkyl, aryl, or aliphyl (aliphatic or cycloaliphatic) radical which may contain non-hydrocarbon substituents such as hydroxy, halo, primary, secondary or tertiary amino or amido, carboxylic, or alkoxy groups. In general, the trinitrophenyl group in the instant ester is the key to the addition compound formation (and decomposition) and the alcoholic group is secondary in function in the molecule so that any alcoholic group that is not actually reactive with respect to the ingredients present may be used. In general, the non-hydrocarbon substituents on the alcohol should not exceed 1 to 3, nor should their total molecular weight ordinarily exceed the molecular weight of the hydrocarbon group or chain to which they are attached in the alcohol group. The selection of the particular ester here involved is in part mere convenience, but primarily is based upon a desired temperature indication. In the starting composition or indicator, both ingredients are in the solid phase. As heating takes place one or the other may melt first and then dissolve the remaining solid, to the extent that both finally are converted to the liquid phase (whether or not a substantial amount of filler material may be present) and at such temperature the color change is effected, presumably, because the formation of the addition compound is made possible. Accordingly, the melting point of the ester may be used as an indication of the particular ester which one may wish to use in a specific indicator system. 2,4,6-trinitrobenzoic acid has a relatively high melting point, and the methyl ester has a lower melting point, but it has probably the highest melting point of any of the instant esters. Preferably the esters employed are $C_1$–$C_6$ aliphyl 2,4,6-trinitrobenzoates, such as methyl, ethyl, propyl, isopropyl, butyl, isobutyl, tertiary butyl, amyl, etc., hexyl etc., cyclopentyl, and cyclohexyl 2,4,6-trinitrobenzoates.

Examples of other 2,4,6-trinitrobenzoates which may be used in the practice of the instant invention include the heptyl, octyl, nonyl, decyl, lauryl (dodecyl), myristyl (tetradecyl), cetyl (hexadecyl), stearyl, etc. esters. Other esters include alkaryl esters such as benzyl, ethyl phenyl, propyl phenyl, etc., aryl such as phenyl, tolyl, xylyl, naphthyl, etc., and other aliphyl groups such as allyl, crotyl, up to linolenyl, methyl cyclohexyl, ethyl cyclohexyl, etc. esters. Other alcohols containing non-hydrocarbon substituents may be used, including alcohols which form chlorphenyl, chlorbenzyl, chlorhexyl, methoxy phenyl, phenoxy phenyl, etc. esters, as well as the esters of polyhydric alcohols such as ethylene or polyethylene glycols, glycerol, etc.; and esters of colamine, lactic acid, methyl lactate, lactamide, N-methyl lactamide, N,N-dimethyl lactamide, etc.

As will be appreciated, any of the esters which may be liquids at certain temperatures ordinarily used for one purpose or another, or even liquids at room temperature, can still be used in the practice of the instant invention as long as they are used for detecting a temperature in the neighborhood of or below their own melting point; and in the case of low melting compounds, such compounds may be used to detect relatively low temperatures. The same is true of the electron donor which will be described hereinafter, since the donor also is a solid in combination with the solid ester in one phase of the instant system (in the "non-indicating" phase). It will also be appreciated that the usual temperature indicating feature of the instant composition involves the application of this composition in its solid phase to an article whose temperature is to be checked, and the effectiveness of the indicator is in indicating just when the critical temperature of the article is reached. The reverse situation could be true wherein the instant composition would be retained in a transparent capsule in, for example, a refrigerator and the composition would show a definite color when the refrigerator had not been cooled sufficiently, but when the proper refrigeration temperature would be reached, the capsule would appear colorless thus indicating to the operator that the proper temperature had been reached.

The electron donors have been divided into certain numbered groups and the first of the groups of electron donors which may be used in the practice of the instant invention is (1) polynuclear aromatic hydrocarbons having 12 to 24 carbon atoms and having 2 to 4 benzene nuclei wherein any conjugated benzene bonds are contained in a 3 to 4 nuclei molecule and any angular conjugated bonds are non-terminal, and non-conjugated members of said hydrocarbons substituted with 1 to 3 monovalent radicals of the class consisting of halo, R, OH, OR, COR, $NR'_2$ and COOR wherein R is $C_1$–$C_4$ alkyl and R' is H or R. Referring first to the hydrocarbons of this group, it will be noted that polynuclear aromatic hydrocarbons of the non-conjugated class containing 2 to 4 benzene nuclei include biphenyl, triphenyl and tetraphenyl, but if there are any conjugated benzene bonds in the instant hydrocarbon, they are contained in a molecule having 3 to 4 nuclei such as

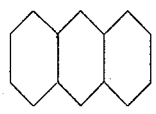

Anthracene

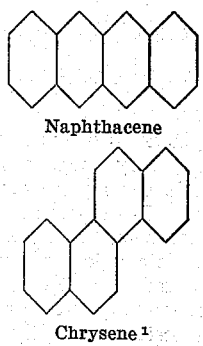

Naphthacene

Chrysene[1]

[1] Wherein the angular conjugated bond is non-terminal.

If there are any angular conjugated bonds in such molecules, the angular conjugated bonds are non-terminal. For example, in

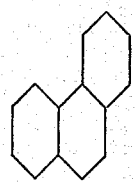

Phenanthrene and

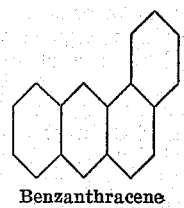

Benzanthracene there are conjugated benzene bonds and there are 3 to 4 nuclei in the molecule. However, the last benzene nucleus in each case is attached to the remainder of the molecule by an angular conjugated bond (as contrasted to a linear conjugated bond which connects the other benzene nuclei in each molecule) and for this reason phenanthrene and benzanthracene are excluded from the scope of the instant invention and, in fact, these two compounds with, for example, methyl 2,4,6-trinitrobenzoate form an unsatisfactory color indicating system which fails to show the color change herein desired. Naphthalene also is inadequate as an electron donor for the purposes of the instant invention and is excluded, because it contains conjugated benzene bonds and only 2 nuclei. If 2 nuclei are to be employed in the practice of the instant invention (in the absence of other substituents) they must be contained in (unconjugated) polyphenyls or, for example, stilbene which has been found to be particularly satisfactory in the practice of the instant invention.

The preferred compounds of this group include anthracene, chrysene, biphenyl and stilbene.

Apparently the hydrocarbons of group 1 have a basic ring structure which is uniquely suitable for the purposes of the instant invention and various substitutions on the ring structure do not appear to make an appreciable difference (unless made to such an extent that the whole character of the compound is altered, as perhaps by putting on a substantial number of nitro groups). The aromatic hydrocarbons may contain only nuclear carbon atoms, or the nuclei may be connected by from 2 to 4 carbon atoms in a chain as in stilbene. In general, compounds used in the practice of the invention may include the instant non-conjugated hydrocarbons of group 1 substituted with 1 to 3 monovalent radicals such as halo, $C_1$–$C_4$ alkyl or alkenyl, or OH, OR, COR and COOR, wherein R is $C_1$–$C_4$ alkyl or alkenyl. Examples of these compounds include o-hydroxy biphenyl, o-chlorobiphenyl, o-methoxybiphenyl, p-bromobiphenyl, diethylaminobiphenyl, etc. and corresponding compounds derived from triphenyl, tetraphenyl, etc.

Another group of compounds which may be used as the electron donors in the practice of the instant invention may be described as (2) halogenated naphthalenes having 1 to 3 halo groups attached to the naphthalene ring structure. Preferably, the halo group is chloro, bromo, or iodo; and the compounds of this group include 2-bromo naphthalene, 1-chloro naphthalene, 1-iodo naphthalene, 1,2-dichloronaphthalene, etc. The naphthalene compounds behave peculiarly in the practice of the instant invention in that relatively few compounds of this class are operative. For example, naphthol is inoperative.

Another group of compounds which may be used in the practice of the instant invention may be described as (3) aromatic compounds having a single benzene nucleus to which are attached 1 to 3 groups of the class consisting of OH, OR, NHCOR, wherein R is $C_1$–$C_4$ alkyl.

Such compounds include phenol, hydroquinone,

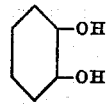

Resorcinol

Dimethoxy resorcinol

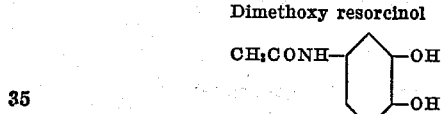

Acetimido resorcinol

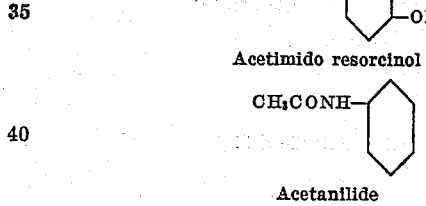

Acetanilide

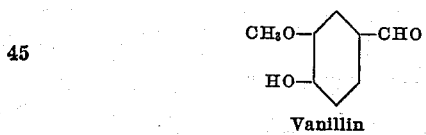

Vanillin

p-Bromophenol

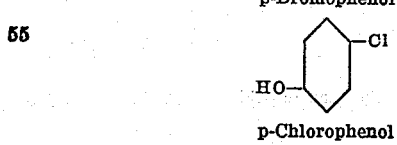

p-Chlorophenol

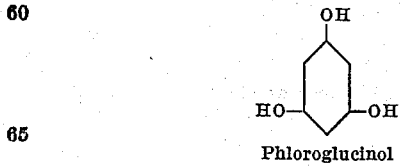

Phloroglucinol

Still another group of compounds which may be used as the electron donors in the practice of the instant invention may be described as (4) aromatic compounds having a single benzene nucleus to which are attached a strong electron withdrawing group or a large bulky group and 1 to 2 amine groups. The strong electron withdrawing groups are recognized in the art, and defined by Remick and Ingold, and these groups include $NO_2$, COOH, COOY, and acyl groups such as COH and COY wherein Y is $C_1$–$C_6$ alkyl or phenyl. The amine groups attached may be primary (—$NH_2$), secondary (—NRH) or tertiary (—NR), wherein R is $C_1$–$C_4$ alkyl or phenyl. Examples include:

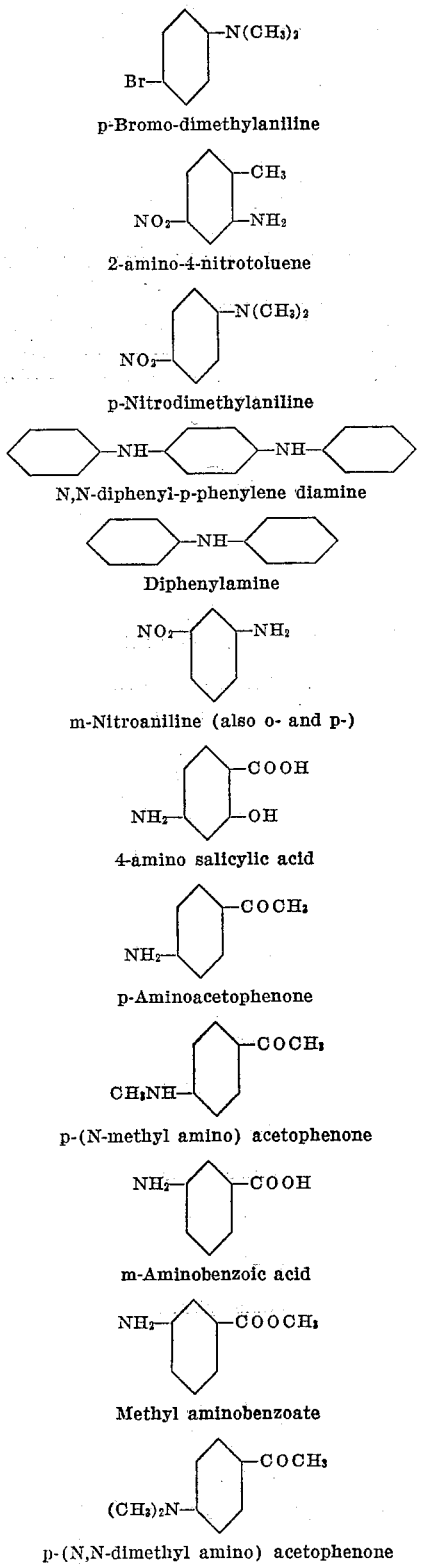

p-Bromo-dimethylaniline 2-amino-4-nitrotoluene p-Nitrodimethylaniline

N,N-diphenyl-p-phenylene diamine

Diphenylamine m-Nitroaniline (also o- and p-)

4-amino salicylic acid p-Aminoacetophenone p-(N-methyl amino) acetophenone m-Aminobenzoic acid Methyl aminobenzoate p-(N,N-dimethyl amino) acetophenone Yet another group of compounds which may be used as electron donors in the practice of the instant invention may be described as (5) aromatic compounds having a single benzene nucleus to which are attached 4 to 6 R groups, wherein R is a $C_1$–$C_4$ alkyl group. A typical member of this group is durene

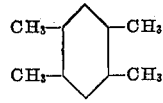

Although the weight ratios of the ester (or esters) and the donor (or donors) may range from 1:20 to 20:1, it is generally preferable to employ weight ratios within the range 1:1 to 5:1. Most preferably, the ester component and the donor component are employed in approximately the eutectic composition, which varies somewhat with the esters used and the donors used. For example, with anthracene the ester-donor eutectic composition for the n-hexyl ester is roughly 4:1; and for the methyl ester it is roughly 7:3. It will be appreciated that two or more esters or acceptors may be used with a single donor, and vice versa, and inert materials may also be included in the system using one or more acceptors and one or more donors. An example of a system containing two acceptors and one donor is two parts (by weight) of the methyl ester, two parts of the n-hexyl ester, and one part anthracene. An example of a system containing one acceptor and two donors is eight parts n-hexyl, one part anthracene, one part resorcinol. An example of a system containing one acceptor, one donor and an inert compound is four parts n-hexyl ester, one part anthracene, and one to ten parts salicylamide.

For the purpose of showing more clearly the critical temperature at which the color change is obtained in the practice of the instant invention, tests were made on compositions comprising 70 to 80 parts of an acceptor, using (A) methyl, (B) ethyl, (C) n-propyl, (D) isopropyl, (E) allyl, (F) n-butyl, (G) n-amyl, and (H) n-hexyl esters, plus 20 to 30 parts of different donors including (1) acetanilide, (2) diphenyl, (3) chrysene, (4) hydroquinone, (5) catechol, (6) resorcinol, and (7) anthracene. The critical temperatures obtained in each case are set forth in the following table:

TABLE 1

Eutectic temperatures between various donors and the esters of 2,4,6-trinitrobenzoic acid (eutectic temperature, °C.)

| Ester | Donor | | | | | | |
|---|---|---|---|---|---|---|---|
| | (1) | (2) | (3) | (4) | (5) | (6) | (7) |
| (A) | 98–100 | 63–64 | 145–146 | 133–134 | 85–86 | 92–93 | 134 |
| (B) | 98–99 | 62–63 | 142–143 | 133–134 | 84–86 | 93–94 | 127 |
| (C) | 93.5–94.5 | 59–60 | 132–133 | 125–126 | 78–80 | 90–91 | 121 |
| (D) | 99–100 | 61–62 | 143–144 | 133–135 | 84–85 | 95–96 | 134.3 |
| (E) | 97–98 | 60–61 | 134–135 | 128–129 | 83–84 | 92–93 | 123 |
| (F) | 85–86 | 54–55 | 117–118 | 111–112 | 72–74 | 82–83 | 107.5 |
| (G) | 85–86 | 54–55 | 115–116 | 113–114 | 74–75 | 83–84 | 106.1 |
| (H) | 90–92 | 55–56 | 118–119 | 112–113 | 79–80 | 91–92 | 106.5 |

It will be noted in particular that the eutectic temperature of the anthracene-ester system is very clearly defined as a temperature, rather than a range, and for this reason anthracene is preferred for use in the practice of the instant invention.

The changes in color manifested in connection with each of the foregoing tests are obtained in substantially the same manner by admixing each of these compositions with an amount of solvent (for example, an equal weight of solvent) such as carbon tetrachloride, butanol, methyl ethyl ketone, or butyl acetate in order to convert the normally solid ester-donor compositions to the liquid phase. As the transition to the liquid phase takes place, either with the addition of a sufficient amount of solvent or by heating, the color changes sharply in each case. Each of the foregoing compositions may be admixed with suitable fillers to form a crayon or writing instrument which may be used to place a mark on the surface of an article and to indicate appropriate temperature changes in such article. For example, the instant compositions are admixed with three times their weight of ground calcium carbonate and compacted to form pieces of chalk. Such pieces of chalk leave a white mark on the surface of articles, which mark turns yellow to orange as the article is heated past the eutectic temperature for the particular composition. For example, using such chalk containing the methyl ester and anthracene in a weight ratio of 4:1, it will be noted that the chalk mark changes from white to orange sharply at 134° C.

Comparable results are obtained using any of the other esters hereinbefore described and/or any of the other donors set forth in the instant disclosure.

In using the compositions of the instant invention, it will be appreciated that such compositions may be included in chalk or crayons used for marking, or they may be included in plastic compositions, paints or varnishes, or the like coating compositions, each possessing an appreciable degree of translucency or transparency, so that the change in color can be appreciated. In such embodiments, the instant invention may be used a temperature indicator, wherein the composition of the invention is retained in a translucent inert material or is exposed on an inert material (which is the case using chalk). As another use for the instant invention, however, the composition may be used in the detection of volatile solvents in the atmosphere.

For example, the instant composition may be applied to a fibrous and/or absorbent carrier medium, such as paper, glass wool, etc. The composition may be impregnated in the paper or merely coated onto the glass fiber surfaces and the resulting paper or glass fiber article is preferably designed to be permeable to air so that it may be used as a filter-like medium for a blower, preventing the air to be blown therethrough, but absorbing or picking up the solvent. In such case, after a small amount of solvent has been absorbed or absorbed onto the surface, the color change will be noticeable and this embodiment may be used to detect the presence of solvents in the air or other vapors.

For the purpose of showing additionally the critical temperatures at which color changes are obtained in the practice of the instant invention, tests were also made on compositions comprising 70 to 80 parts of an acceptor, using (A) methyl, (B) ethyl, (C) n-propyl, (D) iso-propyl, (E) n-butyl, (F) n-amyl, (G) n-hexyl, and (H) allyl esters, plus 20 to 30 parts of different donors including (1) durene, (2) 2-bromonaphthalene, (3) vanillin, (4) o-hydroxybiphenyl, (5) m-aminobenzoic acid, (6) p-aminoacetophenone, and (7) stilbene. The critical temperatures obtained in each case (given as a mean temperature) are set forth in the following Table 2:

TABLE 2

*Eutectic temperatures between various donors and the esters of 2,4,6-trinitrobenzoic acid (eutectic temperature, °C.)*

| Ester | Donor | | | | | | |
|---|---|---|---|---|---|---|---|
| | (1) | (2) | (3) | (4) | (5) | (6) | (7) |
| (A) | 67 | 45 | 69 | 49.5 | 160 | 82 | 102 |
| (B) | 68.5 | 45 | 72 | 47.5 | 138 | 76 | 98.5 |
| (C) | 63 | 42.5 | 70 | 40 | 130 | 74 | 93.5 |
| (D) | 64.5 | 44.5 | 71 | 46.5 | 138 | 77 | 98.5 |
| (E) | 57 | 38.5 | 65 | 43.0 | 113 | 71.5 | 82.5 |
| (F) | 55.5 | 38.0 | 65 | | 115 | 82.5 | 82.5 |
| (G) | 55 | 38 | 68 | 45 | 122 | | 83 |
| (H) | 62.5 | 44 | 69.5 | 44 | 131 | | 95.5 |

It will be understood that modifications and variations may be effected without departing from the spirit and scope of the novel concepts of the present invention.

I claim as my invention:

1. A solid composition comprising an electron acceptor that is an ester of 2,4,6-trinitrobenzoic acid and an electron donor selected from the group of aromatic compounds consisting of (1) polynuclear aromatic hydrocarbons having a total of 6 to 24 carbon atoms having 2 to 4 conjugated benzene nuclei wherein any conjugated benzene bonds are contained in a 3 to 4 nuclei molecule and any angular conjugated bonds are non-terminal, and non-conjugated members of said hydrocarbons substituted with 1 to 3 monovalent radicals of the class consisting of halo, R, OH, OR, COR, NR'$_2$ and COOR wherein R is $C_1$–$C_4$ alkyl and R' is H or R, (2) halogenated naphthalene ring structure, (3) aromatic compounds having a single benzene nucleus to which are attached 1 to 3 groups of the class consisting of OH, OR, NH—COR, wherein R is $C_1$–$C_4$ alkyl, and such compounds having an additional halo substituent, (4) aromatic compounds having a single benzene nucleus to which are attached a strong electron withdrawing group and 1 to 2 amine groups and (5) aromatic compounds having a single benzene nucleus to which are attached 4 to 6 R groups, wherein R is a $C_1$–$C_4$ alkyl group, the acceptor-donor weight ratio being 1:20 to 20:1.

2. A composition comprising an electron acceptor that is an ester of 2,4,6-trinitrobenzoic acid and anthracene, the acceptor-anthracene weight ratio being 1:1 to 5:1.

3. A method which comprises converting from the solid to the liquid phase, by heating, a composition comprising an electron acceptor that is an ester of 2,4,6-trinitrobenzoic acid and an electron donor selected from the group of aromatic compounds consisting of (1) polynuclear aromatic hydrocarbons having a total 6 to 24 carbon atoms having 2 to 4 conjugated benzene nuclei wherein any conjugated benzene bonds are contained in a 3 to 4 nuclei molecule and any angular conjugated bonds are non-terminal, and non-conjugated members of said hydrocarbons substituted with 1 to 3 monovalent radicals of the class consisting of halo, R, OH, OR, COR, NR'$_2$ and COOR wherein R is $C_1$–$C_4$ alkyl and each R' is H or R, (2) halogenated naphthalenes having 1 to 3 halo groups attached to the naphthalene ring structure, (3) aromatic compounds having a single benzene nucleus to which are attached 1 to 3 groups of the class consisting of OH, OR, NH—COR, wherein R is $C_1$–$C_4$ alkyl, and such compounds having an additional halo substituent, (4) aromatic compounds having a single benzene nucleus to which are attached a strong electron withdrawing group and 1 to 2 amine groups and (5) aromatic compounds having a single benzene nucleus to which are attached 4 to 6 R groups, wherein R is a $C_1$–$C_4$ alkyl or phenyl group, the acceptor-donor weight ratio being 1:20 to 20:1.

4. A method which comprises converting from the solid to the liquid phase, by subjecting to solvent action, a composition comprising an electron acceptor that is an ester of 2,4,6-trinitrobenzoic acid and an electron donor selected from the group of aromatic compounds consisting of (1) polynuclear aromatic hydrocarbons having a total of 6 to 24 carbon atoms having 2 to 4 conjugated benzene nuclei wherein any conjugated benzene bonds are contained in a 3 to 4 nuclei molecule and any angular conjugated bonds are non-terminal, and non-conjugated members of said hydrocarbons substituted with 1 to 3 monovalent radicals of the class consisting of halo, R, OH, OR, COR, NR'$_2$ and COOR wherein R is $C_1$–$C_4$ alkyl and R' is H or R, (2) halogenated naphthalenes having 1 to 3 halo groups attached to the naphthalene ring structure, (3) aromatic compounds having a single benzene nucleus to which are attached 1 to 3 groups of the class consisting of OH, OR, NH—COR, wherein R is $C_1$–$C_4$ alkyl, and such compounds having an additional halo substituent, (4) aromatic compounds having a single benzene nucleus to which are attached a strong electron withdrawing group and 1 to 2 amine groups and (5) aromatic compounds having a single benzene nucleus to which are attached 4 to 6 R groups, wherein R is a $C_1$–$C_4$ alkyl group, the acceptor-donor weight ratio being 1:20 to 20:1.

5. An addition compound of an electron acceptor that is an ester of 2,4,6-trinitrobenzoic acid and an electron donor selected from the group of aromatic compounds consisting of (1) polynuclear aromatic hydrocarbons having a total of 6 to 24 carbon atoms having 2 to 4 conjugated benzene nuclei wherein any conjugated benzene bonds are contained in a 3 to 4 nuclei molecule and any angular conjugated bonds are non-terminal, and non-conjugated members of said hydrocarbons substituted with 1 to 3 monovalent radicals of the class consisting of halo, R, OH, OR, COR, $NR'_2$ and COOR wherein R is $C_1$–$C_4$ alkyl and each R' is H or R, (2) halogenated naphthalenes having 1 to 3 halo groups attached to the naphthalene ring structure, (3) aromatic compounds having a single benzene nucleus to which are attached 1 to 3 groups of the class consisting of OH, OR, NH—COR, wherein R is $C_1$–$C_4$ alkyl, and such compounds having an additional halo substituent, (4) aromatic compounds having a single benzene nucleus to which are attached a strong electron withdrawing group and 1 to 2 amine groups and (5) aromatic compounds having a single benzene nucleus to which are attached 4 to 6 R groups, wherein R is a $C_1$–$C_4$ alkyl group, the acceptor-donor weight ratio being 1:20 to 20:1.

6. A crayon or marking instrument formed of an inert filler material and 1–50 weight % thereof of a composition comprising an electron acceptor that is an ester of 2,4,6-trinitrobenzoic acid and an electron donor selected from the group of aromatic compounds consisting of (1) polynuclear aromatic hydrocarbons having a total of 6 to 24 carbon atoms having 2 to 4 conjugated benzene nuclei wherein any conjugated benzene bonds are contained in a 3 to 4 nuclei molecule and any angular conjugated bonds are non-terminal, and non-conjugated members of said hydrocarbons substituted with 1 to 3 monovalent radicals of the class consisting of halo, R, OH, OR, COR, $NR'_2$ and COOR wherein R is $C_1$–$C_4$ alkyl and R' is H or R, (2) halogenated naphthalenes having 1 to 3 halo groups attached to the naphthalene ring structure, (3) aromatic compounds having a single benzene nucleus to which are attached 1 to 3 groups of the class consisting of OH, OR, NH—COR, wherein R is $C_1$–$C_4$ alkyl, and such compounds having an additional halo substituent, (4) aromatic compounds having a single benzene nucleus to which are attached a strong electron withdrawing group and 1 to 2 amine groups and (5) aromatic compounds having a single benzene nucleus to which are attached 4 to 6 R groups, wherein R is a $C_1$–$C_4$ alkyl group, the acceptor-donor weight ratio being 1:20 to 20:1.

7. An article comprising an inert carrier having applied thereto a composition comprising an electron acceptor that is an ester of 2,4,6-trinitrobenzoic acid and an electron donor selected from the group of aromatic compounds consisting of (1) polynuclear aromatic hydrocarbons having a total of 6 to 24 carbon atoms having 2 to 4 conjugated benzene nuclei wherein any conjugated benzene bonds are contained in a 3 to 4 nuclei molecule and any angular conjugated bonds are non-terminal, and non-conjugated members of said hydrocarbons substituted with 1 to 3 monovalent radicals of the class consisting of halo, R, OH, OR, COR, $NR'_2$ and COOR wherein R is $C_1$–$C_4$ alkyl and R' is H or R, (2) halogenated naphthalenes having 1 to 3 halo groups attached to the naphthalene ring structure, (3) aromatic compounds having a single benzene nucleus to which are attached 1 to 3 groups of the class consisting of OH, OR, NH—COR, wherein R is $C_1$–$C_4$ alkyl, and such compounds having an additional halo substituent, (4) aromatic compounds having a single benzene nucleus to which are attached a strong electron withdrawing group and 1 to 2 amine groups and (5) aromatic compounds having a single benzene nucleus to which are attached 4 to 6 R groups, wherein R is a $C_1$–$C_4$ alkyl group, the acceptor-donor weight ratio being 1:20 to 20:1.

References Cited in the file of this patent

UNITED STATES PATENTS

| 1,709,292 | Wagner | Apr. 16, 1929 |
| 2,679,460 | Maneval | May 25, 1954 |

FOREIGN PATENTS

| 132,222 | Switzerland | Mar. 31, 1929 |

OTHER REFERENCES

Shoruigin et al.: Chem. Abst. 25, 4248 (1931).
Pelchowicz et al.: Chem. Abst. 46, 2889 (1952).